United States Patent [19]

Chiu

[11] Patent Number: 5,058,529
[45] Date of Patent: Oct. 22, 1991

[54] AIR MIXING WATER PUMP SYSTEM FOR NATURAL AQUARIUM

[76] Inventor: Te-Long Chiu, 1188 Spring Hill Way, San Jose, Calif. 95120

[21] Appl. No.: 500,566

[22] Filed: Mar. 28, 1990

[51] Int. Cl.⁵ .............................................. A01K 63/00
[52] U.S. Cl. ......................................... 119/3; 119/5; 261/82
[58] Field of Search .................... 119/5, 3; 261/81, 82, 261/35; 417/118, 119, 137, 476; 418/45, 153

[56] References Cited

U.S. PATENT DOCUMENTS

| | | | |
|---|---|---|---|
| 340,824 | 4/1886 | Schmalz | 119/5 |
| 1,588,840 | 6/1926 | King | 417/119 |
| 2,826,993 | 3/1958 | McChesney | 418/45 |
| 3,269,578 | 8/1966 | Lewis | 119/5 X |
| 3,687,580 | 8/1972 | Griffiths | 418/45 |
| 3,888,210 | 6/1975 | Buss | 119/3 |
| 4,371,321 | 2/1983 | Koblo et al. | 418/45 |
| 4,807,565 | 2/1989 | Hawthorne | 119/5 |

FOREIGN PATENT DOCUMENTS

| | | | |
|---|---|---|---|
| 2708277 | 8/1978 | Fed. Rep. of Germany | 418/45 |
| 0024870 | 10/1922 | France | 417/137 |
| 0789082 | 12/1980 | U.S.S.R. | 119/3 |
| 1149906 | 4/1985 | U.S.S.R. | 119/3 |

Primary Examiner—Robert P. Swiatek
Assistant Examiner—Todd E. Manahan

[57] ABSTRACT

The present invention relates to an air-water switching unit which consists of an air-water switching chamber with a movable piston residing inside the chamber and separating air coming into the chamber through an air inlet at one side and water coming into the chamber through a water inlet at the other side of the chamber. An air-water outlet is located between the air inlet and the water inlet. The movement of the piston is controlled by the pressure difference between the air pressure on one side and the water pressure on the other side of the piston. The air mixing water pump according to the present invention comprises the air-water switching unit, an air pump connected to the air inlet of the air-water switching chamber of the air-water switching unit, water supply from the output of a water filter connected to the water inlet of the air-water switching chamber, and a PVC tube connected to the air-water outlet of the air-water switching chamber. The PVC tube goes back to the aquarium at the location above the water level. The present invention also includes the application of the air-water switching unit and the air mixing water pump system in a fountain aquarium and an aquagarden.

6 Claims, 2 Drawing Sheets

AIR MIXING WATER PUMP SYSTEM FOR NATURAL AQUARIUM

TECHNICAL FIELD

The present invention relates to an air mixing water pump and its application in the particle filtration system for a water fountain system and a natural aquarium system.

BACKGROUND ART

The water pump system available today utilizes a rotating blade system to pressurize water and move it in a certain direction. It does not mix air into water. For aquarium type application, it is extremely desirable to provide the oxygen rich clean water to the aquarium so that the fishes and the water plants can live in good health.

BRIEF SUMMARY OF THE INVENTION

It is accordingly a key object of the present invention to provide a water pump that can mix air as well as pump water to the aquarium. The air mixing water pump according to the present invention comprises an air-water switching unit which consists of an air-water switching chamber with a movable piston residing inside the chamber, separating air coming into the chamber through an air inlet at one side and water coming into the chamber through a water inlet at the other side of the chamber, and having an air-water outlet between the air inlet and the water inlet; an air pump connected to the air inlet at one side of the air-water switching chamber of the air-water switching unit; water supply from the output of a water filter connected to the water inlet at the other side of the air-water switching chamber; and a PVC tube connected to the air-water outlet of the air-water switching chamber and going back to the aquarium at a location above the water level. Assuming the air inlet is at the left side and the water inlet is at the right side of the air-water switching chamber, and the movable piston is at the left side of the air-water switching chamber, the water will flow through the water inlet into the chamber to the air-water outlet until the water level in the PVC tube connected to the air-water outlet reaches the same level as that in the aquarium. As the air pressure builds up on the left side of the piston and eventually moves the piston all the way to the right side of the air-water switching chamber, the air will push the water at the air-water outlet to higher and higher level until water comes out of the PVC tube into the aqurium. As the water comes out of the PVC tube, air pressure at the left side of the movable piston drops back and the water pressure will push the piston all the way to the left. The water will again fill up the chamber and the PVC tube to the same water level as that in the aquarium. Since the air which is pushing the water from the air-water outlet through the PVC tube into the aquarium is in direct contact with the water under the pressure, it will diffuse into and mix with water.

It is another object of the present invention to provide a fountain aquarium. The fountain aquarium consists of an upper hemisphere with the fountain shower head at the top and a lower hemisphere, with the drain at the bottom, filled with water for growing fishes and plants; a particle filter connected between the drain at the bottom of the lower hemisphere and the water inlet of the air-water switching unit; an air pump connected to the air inlet of the air-water switching unit; and a PVC tube connected between the air-water outlet of the air-water switching unit and the fountain shower head at the top of the upper hemisphere.

It is another object of the present invention to provide an aquagarden. The aquagarden according to the present invention consists of an aquarium with a bottom drain and an air-water inlet for air and clean water return; a water tank having a bottom water inlet to a filter area, a water plants growing area, and a clean water outlet; a reverse flush two way valve connected to the bottom drain of the aquarium and the bottom water inlet of the water tank; and an air-water switching unit having an air inlet connected to an air pump, a water inlet connected to the clean water outlet of the water tank, and an air-water outlet connected to the air-water inlet of the aquarium.

BRIEF DESCRIPTION OF THE DRAWINGS

The various features, objects, and advantages of the present invention will become more apparent upon consideration of the following brief description of the drawings illustrating the preferred embodiments of the present invention, wherein.

DETAILED DESCRIPTION OF THE PREFERRED EMBODIMENT

Figure 1A:
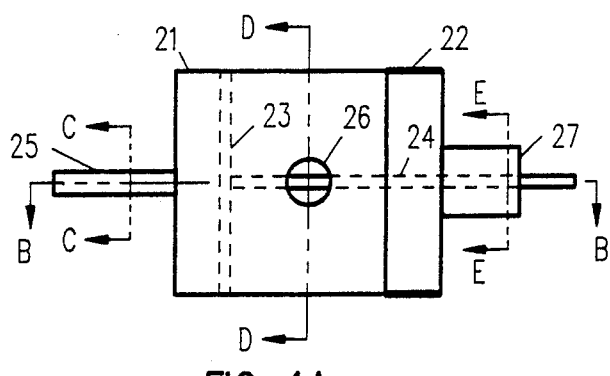
FIG. 1A is the top view.
Figure 1E:
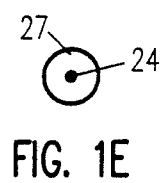
FIG. 1B through 1E are the cross section views along cross section B—B through E—E of the air-water switching unit constructed in accordance with the present invention.
Figure 1D:
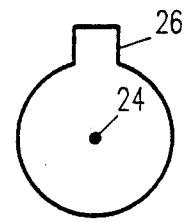
Figure 1B:
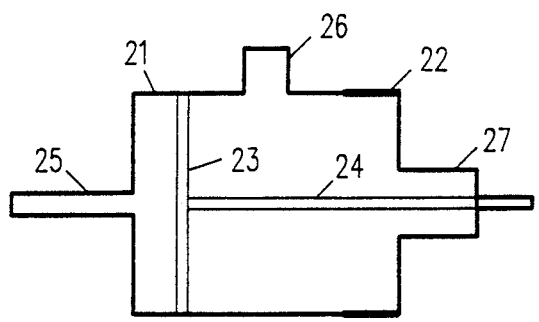
Figure 1C:
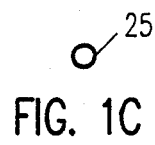

The air-water switching unit constructed according to the present invention consists of an air-water switching chamber having an air inlet 25 at the left side, a water inlet 27 at the right side, and an air-water outlet 26 at the center of the air-water switching chamber, and a piston 23 connected to a piston bar 24 residing inside the air-water switching chamber as shown in FIG. 1A through 1E. The air-water switching chamber can be fabricated by pushing a smaller diameter left chamber 21 all the way into the bigger diameter right chamber 22 and glueing them together to make sure the interior wall of the air-water switching chamber is smooth so that the piston can move freely. In normal application, the water inlet 27 is connected to the filter that is connected to the aquarium, the air inlet 25 is connected to the air pump, and the air-water outlet 26 is connected by a PVC tube to the aquarium at the level higher than the water surface in the aquarium. The principle of operation of the air-water switching unit is based on the pressure differential between the left and the right of the piston to move the piston to the left or to the right to let the water or the air to go to the air-water outlet. Before the air pressure from the air pump builds up, the piston is pushed all the way to the left to let in the water through the water inlet to fill the air-water switching chamber and the PVC tube connected to the air-water outlet. The water level at the PVC tube can rise to the same level as the water level in the aquarium. As the air pressure gradually builds up at the left side of the piston and eventually exceeds the water pressure at the right side of the piston, the piston is pushed to the right side of the chamber and the air pressure will also push the water level at the PVC tube higher and higher and eventually pushes all the water in the PVC tube out into the aquarium. As the water comes out of the PVC tube, the air pressure is released and the air pressure to the left of the piston drops to the ambient pressure. The water pressure to the right of the piston exceeds the air pressure at the left of the piston and the piston is pushed to the left side of the air-water switching chamber. Again the water from the water inlet fills the chamber and the PVC tube. The cycle described above will continue to repeat itself.

Figure 2A:
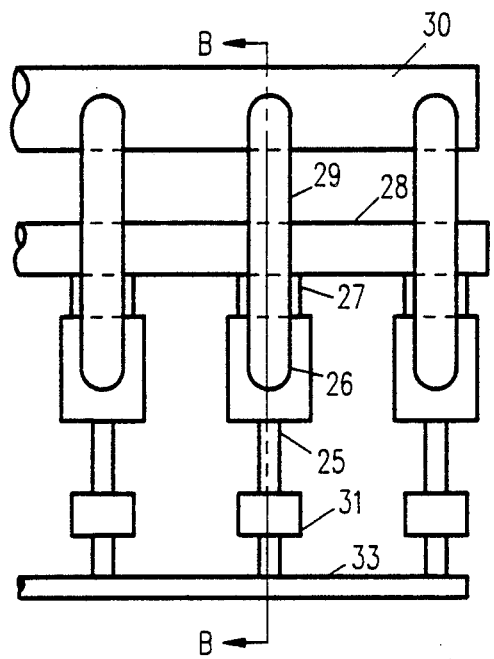
FIG. 2A is the top view and FIG. 2B is the cross section view along cross section B—B of the air-water switching units connected in parallel constructed in accordance with the present invention.
Figure 2B:
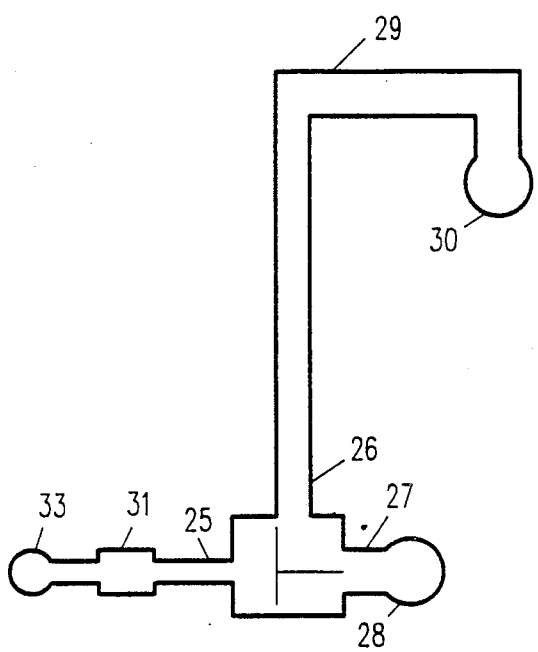

The air-water switching units connected in parallel according to the present invention is shown in FIG. 2A and FIG. 2B. The water inlet 27 of each air-water switching unit is connected to a common water intake 28, and the air inlet 25 of each air-water switching unit is connected to a separate air flow regulator 31 then to a common air intake 33. The air flow regulator 31 is to adjust the air flow going into each air-water switching unit so that the water at the air-water outlet of each air-water switching unit can be pumped out at the same time. The air-water outlet 26 of each air-water switching unit is connected through a PVC tube 29 to a common outgoing water line 30.

Figure 3A:
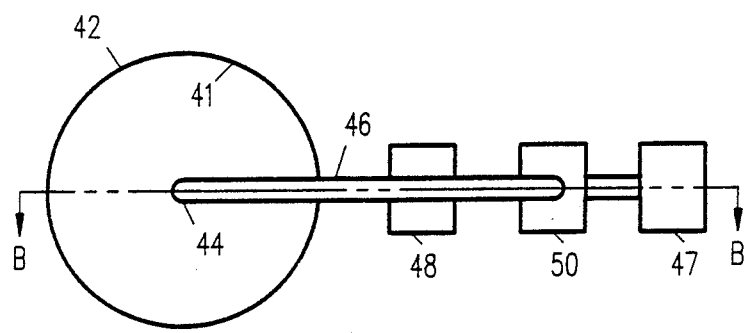
FIG. 3A is the top view.
Figure 3B:
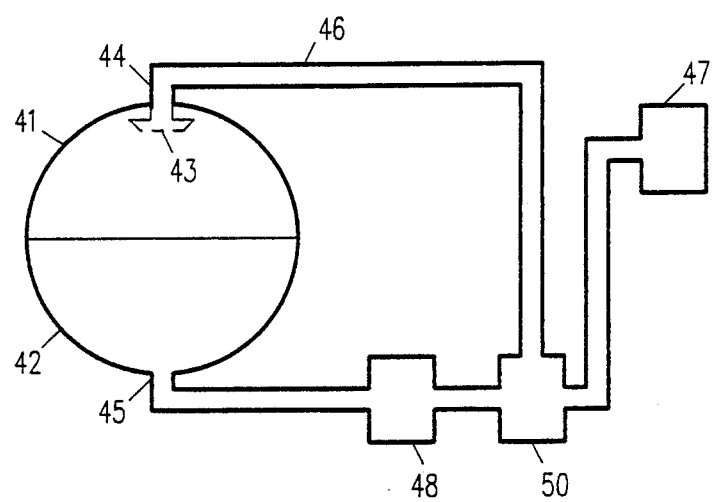
FIG. 3B is the cross section view along B—B of the fountain aquarium constructed according to the present invention.

The fountain aquarium constructed according to the present invention consists of an upper hemisphere 41 with the fountain shower head 43 connected to the clean water inlet 44 at the top, a lower hemisphere 42 with bottom drain 45 filled with water for fishes and water plants, a particle filter 48 connected between the bottom drain 45 of the lower hemisphere 42 and the water inlet of the air-water switching unit 50, an air pump 47 connected to the air inlet of the air-water switching unit 50, and a PVC tube 46 connected between the air-water outlet of the air-water switching unit 50 and the clean water inlet 44 to the fountain shower head 43 at the top of the upper hemisphere 41 as shown in FIGS. 3A and 3B. The aquarium water goes through the bottom drain 45 to the filter 48 into the air-water switching unit 50 and is pumped back to the shower head 43 through the PVC tube 46.

Figure 4:
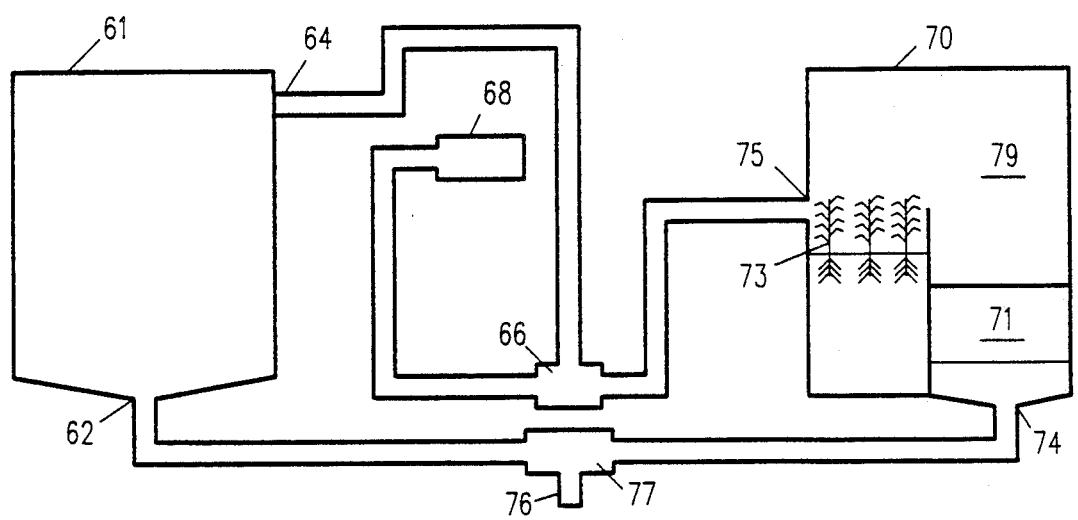
FIG. 4 is the front view of the aquagarden constructed according to the present invention.

The aquagarden constructed according to the present invention consists of an aquarium 61 with the bottom drain 62 and the air-water inlet 64 for the air and the clean water return, a water tank 70 having a bottom water inlet 74 to the filter area 71, the water plants 73 growing area, and a clean water outlet 75, a reverse flush two way valve 77 connecting the bottom drain 62 of the aquarium 61 and the bottom water inlet 74 of the water tank 70, an air-water switching unit 66 having an air inlet connected to an air pump 68, a water inlet connected to the clean water outlet 75 of the water tank 70, and an air-water outlet connected to the air-water inlet 64 of the aquarium 61 as shown in FIG. 4. The aquarium water goes through the bottom drain 62 through the reverse flush two way valve 77 to the bottom water inlet 74 of the water tank 70, then through the filter 71 to the clean water storage area 79, then through the clean water outlet 75 of the water tank 70 to the water inlet of the air-water switching unit 66, then is pumped through the air-water outlet of the air-water switching unit 66 to the air-water inlet 64 of the aquarium 61. To clean the particles cumulated at the filter, the reverse flush two way valve is set such that the water can flow from the bottom inlet 74 of the water tank 70 through the reverse flush two way valve 77 to the drain 76.

The present invention has been set forth in the form of the preferred embodiments. Various modifications of the preferred embodiments disclosed herein may be made by those skilled in the art upon reference to this disclosure without departing from the scope and the spirit of the present invention. Moreover, such modifications are considered to be within the purview of the appended claims.

I claim:

1. An air-water switching unit comprising:
   an air-water switching chamber having an air inlet at one side of said chamber, a water inlet at the other side of said chamber separated from said air inlet by a movable piston, and an air-water outlet between said air inlet and said water inlet;
   said piston residing inside said air-water switching chamber and attached to a piston bar;
   whereby, said piston is moved by a pressure difference between air on one side and water on the opposite side of the piston.

2. An air mixing water pump system comprising:
   an air-water switching unit comprising:
      an air-water switching chamber having an air inlet at one side of said chamber, a water inlet at the other side of said chamber separated from said air inlet by a movable piston, and an air-water outlet between said air inlet and said water inlet;
      said piston residing inside said air-water switching chamber and attached to a piston bar;
      whereby, said piston is moved by a pressure difference between air on one side and water on the opposite side of the piston;
   an air pump connected to said air inlet of said air-water switching unit;
   a water tank having a bottom drain connected to a filter, said filter being connected to said water inlet of said air-water switching unit and a clean water return inlet located above the water surface in said water tank and connected to said air-water outlet of said air-water switching unit through a tube;
   whereby, when water pressure on one side of the piston exceeds air pressure at the opposite side of said piston in said air-water switching unit, said piston is moved toward said air inlet by the pressure difference, thus allowing water from said water tank to flow through said water inlet into said air-water switching chamber and fill said tube connecting said air-water outlet to said clean water return inlet of said water tank to the same water level as that in said water tank, and whereby, as the air pressure increases at one side of said piston and finally exceeds the water pressure at the opposite side of said piston, the pressure difference moves said piston away from said air inlet, thus allowing air to flow through said air inlet into said air-water switching chamber and push the water out of the said air-water switching chamber through said tube and into said water tank, and whereby, as the air pressure drops below the water pressure, the pressure difference moves said piston back towards said air inlet, thus allowing the water to again flow into the air-water switching chamber and fill said tube to the same level as the water level at said water tank.

3. A fountain aquarium comprising:
an air-water switching unit comprising:
- an air-water switching chamber having an air inlet at one side of said chamber, a water inlet at the other side of said chamber separated from said air inlet by a movable piston, and an air-water outlet between said air inlet and said water inlet;
- said piston residing inside said air-water switching chamber and attached to a piston bar;
- whereby, said piston is moved by a pressure difference between air on one side and water on the opposite side of the piston;
a lower hemisphere with a bottom drain, said lower hemisphere being filled with the water for fishes and water plants;
an upper hemisphere resting on said lower hemisphere so as to form a complete sphere; said upper hemisphere having a fountain shower head connected to an air-water inlet in the top of said sphere;
a particle filter connected between said bottom drain of said lower hemisphere and said water inlet of said air-water switching unit;
an air pump connected to said air inlet of said air-water switching unit;
an air-water return tube connecting said air-water outlet of said air-water switching unit to said air-water inlet of said upper hemisphere;
whereby, the aquarium water flows through said particle filter into said air-water switching unit and is pumped back to said air-water inlet of said upper hemisphere.

4. An aquagarden comprising:
an air-water switching unit comprising:
- an air-water switching chamber having an air inlet at one side of said chamber, a water inlet at the other side of said chamber separated from said air inlet by a movable piston, and an air-water outlet between said air inlet and said water inlet;
- said piston residing inside said air-water switching chamber and attached to a piston bar;
- whereby, said piston is moved by a pressure difference between air on one side and water on the opposite side of the piston;
an aquarium with a bottom drain and an air-water inlet at higher level than the water level in said aquarium;
a water tank having a bottom water inlet connected to a filter compartment, a clean water outlet, and a water plants growing area;
a reverse-flush, two-way valve connecting said bottom drain of said aquarium and said bottom inlet of said water tank;
an air pump connected to said air inlet of said air-water switching unit;
said air-water outlet of said air-water switching unit connected to said air-water inlet of said aquarium;
said water inlet of said air-water switching unit connected to said clean water outlet of said water tank;
whereby, aquarium water flows through said reverse-flush, two-way valve, through said bottom water inlet and said filter compartment of said water tank, and then through said clean water outlet of said water tank into said water inlet of said air-water switching unit, and is then pumped through said air-water outlet of said air-water switching unit to said air-water inlet of said aquarium.

5. An aquagarden comprising:
multiple air-water switching units connected in parallel, each air-water switching unit comprising:
- an air-water switching chamber having an air inlet at one side of said chamber, a water inlet at the other side of said chamber separated from said air inlet by a movable piston, and an air-water outlet between said air inlet and said water inlet;
- said piston residing inside said air-water switching chamber and attached to a piston bar;
- whereby, said piston is moved by a pressure difference between air on one side and water on the opposite side of the piston;
said water inlet of each said air-water switching unit connected to a common water intake;
said air inlet of each said air-water switching unit connected to a separate air flow regulator, said air flow regulators connected to a common air intake;
said air-water outlet of each said air-water switching unit connected to a common outgoing water line;
an aquarium with a bottom drain and an air-water inlet at higher level than the water level in said aquarium;
a water tank having a bottom water inlet to a filter compartment, a clean water outlet, and a water plants growing area;
a reverse-flush, two-way valve connecting said bottom drain of said aquarium and said bottom inlet of said water tank;
an air pump connected to said common air intake of said air-water switching units;
said common outgoing water line of said air-water switching units connected to said air-water inlet of said aquarium;
said common water intake of said air-water switching units connected to said clean water outlet of said water tank;
whereby, aquarium water flows through said reverse-flush, two way valve, through said bottom water inlet and said filter compartment of said water tank, and then through said clean water outlet of said water tank into said common water intake of said air-water switching units, and is then pumped through said common outgoing water line of said air-water switching units to said air-water inlet of said aquarium.

6. Multiple air-water switching units connected in parallel, each air-water switching unit comprising:
- an air-water switching chamber having an air inlet at one side of said chamber, a water inlet at the other side of said chamber separated from said air inlet by a movable piston, and an air-water outlet between said air inlet and said water inlet;
- said piston residing inside said air-water switching chamber and attached to a piston bar;
- whereby, said piston is moved by a pressure difference between air on one side and water on the opposite side of the piston;
said water inlet of each said air-water switching unit connected to a common water intake;
said air inlet of each said air-water switching unit connected to a separate air flow regulator, each said air flow regulator connected to a common air intake;
said air-water outlet of each said air-water switching unit connected to a common outgoing water line.

* * * * *